Sept. 27, 1960 K. E. BURG ET AL 2,954,090
SYSTEM FOR IMPROVING SEISMIC RECORDS OF UNDERGROUND STRATA
Filed July 28, 1953 3 Sheets-Sheet 1

INVENTORS
Kenneth E. Burg and
Edgar J. Stulken
BY Stevens, Davis, Miller and Mosher
ATTORNEYS Sept. 27, 1960 K. E. BURG ET AL 2,954,090
SYSTEM FOR IMPROVING SEISMIC RECORDS OF UNDERGROUND STRATA
Filed July 28, 1953 3 Sheets-Sheet 2

INVENTORS
Kenneth E. Burg and
Edgar J. Stulken
BY Stevens, Davis, Miller & Mosher
ATTORNEYS Sept. 27, 1960  K. E. BURG ET AL  2,954,090
SYSTEM FOR IMPROVING SEISMIC RECORDS OF UNDERGROUND STRATA
Filed July 28, 1953  3 Sheets-Sheet 3

INVENTORS
Kenneth E. Burg and
Edgar J. Stulken

BY Stevens, Davis, Miller and Mosher
ATTORNEYS

United States Patent Office 2,954,090
Patented Sept. 27, 1960

2,954,090

SYSTEM FOR IMPROVING SEISMIC RECORDS OF UNDERGROUND STRATA

Kenneth E. Burg and Edgar J. Stulken, Dallas, Tex., assignors to Texas Instruments Incorporated, Dallas, Tex., a corporation of Delaware Filed July 28, 1953, Ser. No. 370,846

8 Claims. (Cl. 181—.5)

This invention relates to a system for improving the results obtained in seismic reflection work over water covered areas by eliminating undesirable wave trains which confuse, obscure, or jeopardize the identification of desired reflections from underlying horizons. More specifically, this invention relates to a system of eliminating the undesirable effects from a wave train by introducing a screen of gas bubbles or foreign materials into the liquid layer or water medium as a wave absorbing or dispersing medium.

It has been found while surveying over water in certain areas that seismic records which at first appeared to be very good reflection records were in reality made up of sound reverberations in the water and near surface layers. This phenomenon was noticed regardless of whether the reverberations were generated by the detonation of an explosive placed generally within the water layer, above the water surface or in holes drilled below the water bottom. These water transmitted waves had the effect of either jeopardizing identification or else totally obscuring the desired reflections from the various substrata horizons. The seismograms thus produced show that wave amplitudes persisted at levels that appeared in some cases to be practically constant. The chief characteristic of these records, however, was periodicity or a state of near periodicity with often an almost exact detailed repetition of trace movement period after period.

The circumstances causing this result can be attributed to several factors. The phenomenon is more pronounced over areas where the bottom of the water layer was smooth, level and composed of material with a high coefficient of reflection. As a counterpart to the hard, smooth bottom, the water surface also provides a good reflector due to the large velocity contrast between the water-air layers. In many areas, there are a succession of thin, hard, high velocity layers below the water bottom which reflect energy upward into the water layer thereby contributing to the complexity of the sound wave reverberations. Apart from the physical characteristics of the seismic prospect, the equipment used can add to the effect. For example, the use of an amplifier provided with the feature of automatic volume control increases the gain for waves whose energy decreased during the various reflections off the bottom layer and water surface so that an impression of a long train of waves of almost constant amplitude is created.

As a result of investigations along the lines above indicated, a theory has been developed to explain these wave trains which has made it possible to predict accurately certain of the characteristics of these wave trains such as frequency, phase, and group velocity. This theory is that a water layer bounded by a smooth, generally level layer of material with a high coefficient of reflection forms an effective wave guide for seismic energy propagation. With but minor modifications, conventional electromagnetic wave guide theory applies to this seismic phenomenon.

As a brief explanation of the theory, assume a layer of water underlain by a layer of limestone or other material with a high reflection coefficient. Assume further that the top of this layer, as well as the top of the water, is relatively smooth and horizontal. If a charge of dynamite or other sound generating device is actuated, sound waves are set up which reverberate within the water, and while reverberating, spread out in approximate accord with spherical wave expansion theory and in accord with the law of reflection. Upon tracing out either the ray geometry or wave geometry applicable to a particular locality in which a seismometer or hydrophone may be suspended, it becomes apparent that constructive interference or reinforcement can easily exist between different wave arrivals or between different cycles of a wave train. This can be seen most easily for any point along the vertical line through the source. For a point offset to one side of the source, Figures 1 and 2 illustrate by means of ray diagrams different energy arrivals at this point for:

(a) A wave propagated downward at the start and directed downward at termination, the $Q_d$ wave.

(b) A wave propagated downward at the start and directed upward at termination, the $Q_u$ wave.

(c) A wave propagated upward at the start and directed downward at termination, the $P_d$ wave.

(d) A wave propagated upward at the start and directed upward upon termination, the $P_u$ wave.

(e) The $Q_d$ waves, taken as one example of the four types of paths, involve different numbers of reflections off the free surface of the water.

Thus, it is clear that any point in the water layer is subject to repeated energy arrivals even though a single sharp pulse or at most a very short wave train is emitted. If all these arrivals are properly accounted for on a time scale and if terminal direction of propagation and pulse shifts are taken into account, then it can be seen that any wave form will be reinforced which can be fitted into the pattern of energy arrivals. This pattern of energy arrivals is shown in Figure 3 with pressure plotted schematically with respect to travel time.

In this way a water layer operates as an excellent wave guide transmitting from the source to receiver just the particular class of wave forms which at any moment fits the geometric considerations of travel time, water depth, sound velocity, and horizontal offset of the receiver from the source. As stated previously, seismograms from such a prospect show that this phenomenon can be so pronounced that all normal reflections from underlying beds will be completely lost.

It will be appreciated from the above that more useful seismograms can be made if some means of eliminating these undesirable wave trains is provided. This is accomplished by the present invention by introducing into the path of the wave absorbing or dispersing materials.

It is accordingly an object of this invention to provide a system to destroy undesirable wave trains in a liquid or water medium and to obtain records from underlying strata which could not otherwise be obtained.

It is a further object of this invention to provide a system of seismic prospecting over certain water covered areas which will function more efficiently and accurately to obtain seismic data than methods heretofore available.

Other objects and advantages of the present invention will become readily apparent from a detailed consideration of the following description when taken in conjunction with the appended drawings in which.

Experiments, which have been conducted over seismic prospects of the character referred to above, and during which undesirable wave trains of the type previously mentioned were produced, have shown that these waves are sufficiently altered in passing through a dispersing or absorbing screen placed in the path of the waves that their undesirable effect are effectively eliminated. One way found to reduce the undesirable wave trains is to introduce air into the liquid layer to form an absorbing or dispersing screen. A suitable manner of accomplishing this end is to deliver air to a header with appropriate lengths of hose attached to the header with hundreds of small holes in each length of hose. This header with the various lengths of hose forms a screen of the desired length and thickness so that the detecting sources are adequately screened from the wave train. Another effective screen can be formed by stringing a slow burning explosive along a desired path. When detonated at an appropriate interval of time before detonating the main charge, relatively large quantities of gases are formed to effectively destroy the undesirable wave trains. Chemicals reacting with water to release gas bubbles provide substantially the same results when used in sufficient quantities. A further way of producing a screen is to enclose a preliminary charge within a substance, such as foam rubber, that disintegrates into numerous small, finely divided particles when the charge is exploded. The force of the explosion throws the particles out to form a hemisphere of sound dispersing and absorbing particles through which the undesirable wave trains resulting from the regular reflection shot have to pass and, in the process, are eliminated. The mention of these specific examples is not to be construed as a limitation upon this invention, since it is within the scope and intent of this invention to claim any means and method by which a sound dispersing or absorbing screen can be formed in the liquid layer to reduce or eliminate effectively the disturbing wave trains. As an example of a further means to form a gas bubble screen, the liberation of hydrogen and oxygen gases by electrolysis could be considered.

Figure 4:
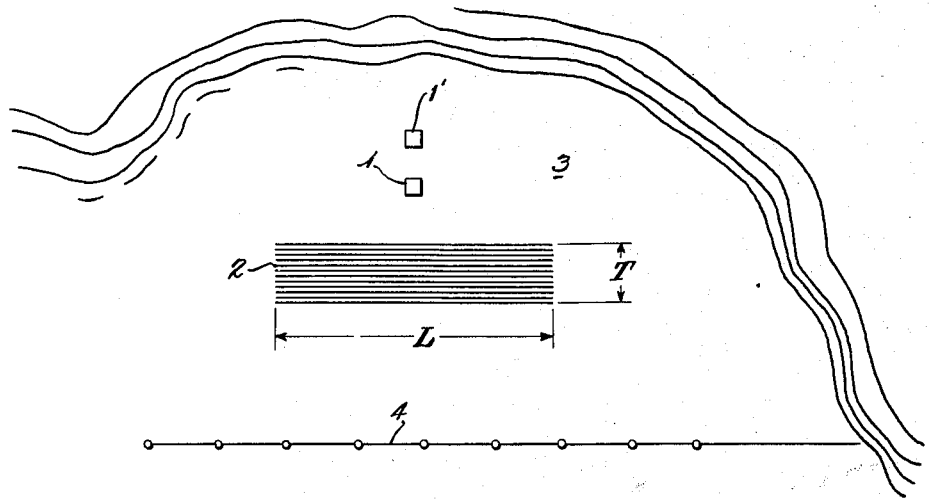
Figure 4 represents a plan view of a T-offset shot arrangement with a screen located between the sound source and the detecting source.
Figure 7:
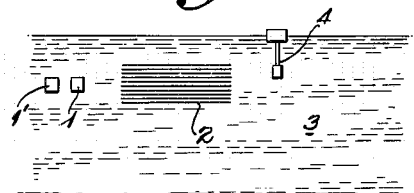
Figure 7 is a view in side elevation of the arrangement shown in Figure 4.

Referring now to the drawings, Figure 4 is a plan view of a T-offset shot arrangement. As shown, an absorptive or dispersive screen 2 is placed in the water 3 between a sound source 1 and an array of detecting sources 4 so that the energy traveling outwardly from the source 1 will not form a repetitive pattern. The length L of the screen 2 is such that due to the geometry of the sound source or charge 1 in relation to the offset distance and the length of the detecting sources or spread 4, no ray path can reach any seismometer of the spread without passing through screen 2. In order to secure an adequate layer of sound absorbing material, the thickness T of screen 2 is variable depending on the conditions prevailing at each seismic prospect. Figure 7, which is a side view of Figure 4, shows screen 2 formed at approximately the depth of charge 1 or slightly lower and extending upwardly towards the surface. Thus, the screen 2 is in a position to absorb the reflections from both the water surface and from the bottom and to effectively absorb all reflections regardless of the angle of incidence.

Figure 1:
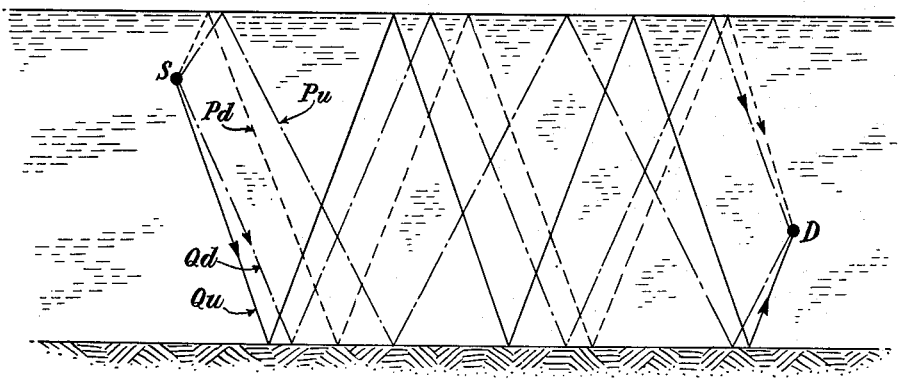
Figure 1 illustrates the theory of standing wave trains and their influence on regular reflections from underlying horizons and shows in particular the four types of ray paths taken by waves in a water medium when the bottom is level, smooth, and composed of material with a high coefficient of reflection.
Figure 2:
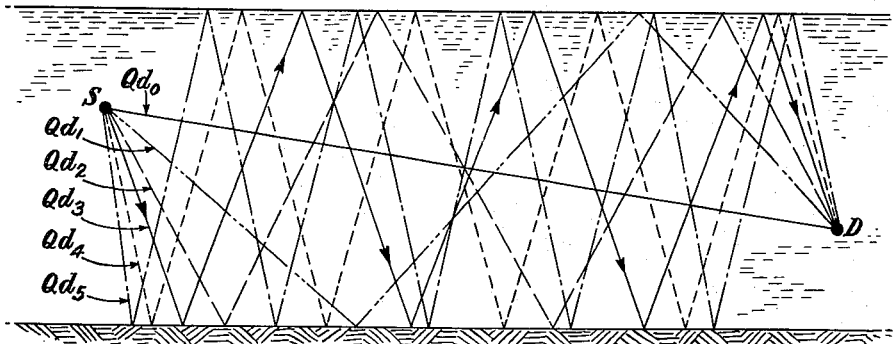
Figure 2 shows a series of reflection paths taken by waves common to one of the four types of paths, in this case, the type of path which is generated downwardly initially and passes the detector in a downward direction.
Figure 3:
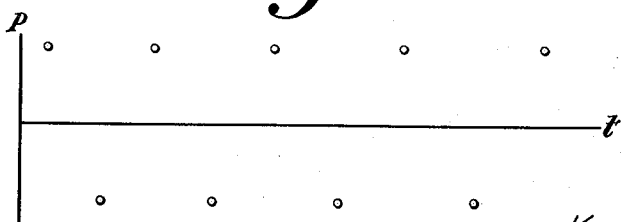
Figure 3 represents a plot of the pulse arrivals at the detector of reflections alternately from the air-water surface and from the water bottom with respect to time.
Figure 5:
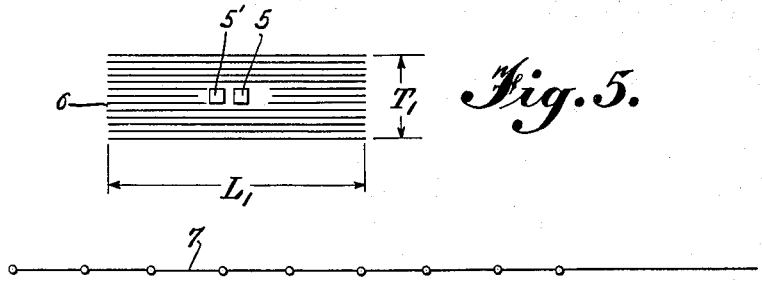
Figure 5 is a view in plan illustrating a T-offset shot arrangement with a shot located in the center of the screen.
Figure 8:
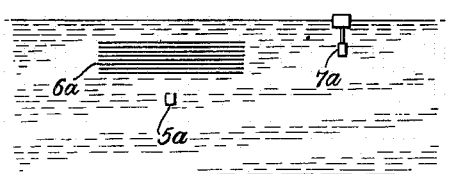
Figure 8 is a view in side elevation of the arrangement shown in Figure 5.
Figure 9:
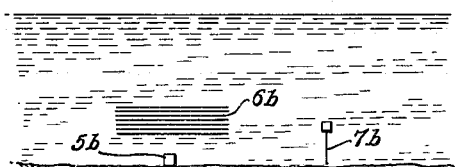
Figure 9 is a view in side elevation showing a T-offset shot arrangement like Figure 5 with the charge and seismometer spread located adjacent the bottom of the water medium.

Figure 5 shows a plan view similar to the charge and seismometer spread arrangement shown in Figure 4 with the exception of the absorptive or dispersive screen 6 located over charge 5. In this arrangement, the length $L_1$ of screen 6 need not be as long as the length of screen 2 in Figure 1 to intercept the multiple reflections from the charge but the thickness $T_1$ is again variable depending upon the conditions prevailing at each seismic prospect. Screen 6 in this instance absorbs and disrupts the sound energy generated in an essentially vertical direction before the wave guide phenomenon can be formed. The seismometer spread is shown as 7. Figures 8 and 9 show side views of two arrangements for the one shown in Figure 5. Figure 8 indicates charge 5a suspended in the fluid medium, screen 6a centered above the charge, and seismometer spread 7a floated from the surface. Figure 9 differs from Figure 8 in that the charge 5b is positioned on the bottom, screen 6b centered above charge 5b and seismometer spread 7b located practically in contact with the bottom. These figures illustrate that regardless of the location of the charge and/or the seismometer spread, a properly positioned screen will effectively eliminate undesirable wave trains.

Figure 6:
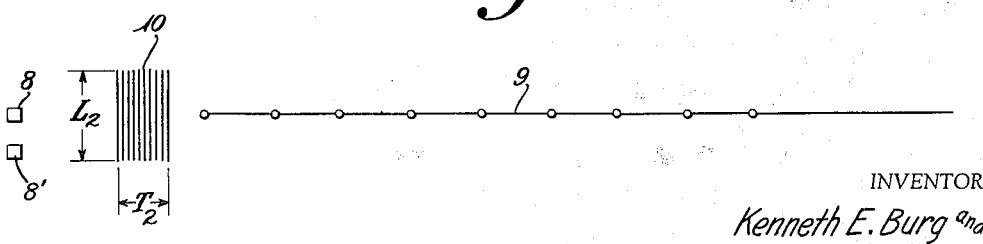
Figure 6 is a view in plan illustrating the charge in line with the seismometer spread and a screen located between the charge and the seismometer spread.
Figure 10:
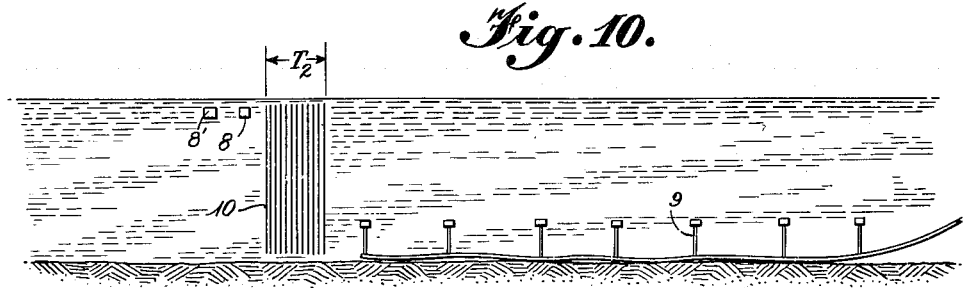
Figure 10 is a view in side elevation of the arrangement shown in Figure 6.

Figure 6 shows an explosive charge 8 placed in line with a seismometer spread 9 and a screen 10 positioned between the charge and the spread. Screen 10 requires no special length $L_2$ except to insure that seismometer spread 9 is adequately shielded from charge 8, but the criterion for the thickness $T_2$ is the same as for screens 2 and 6. Figure 10, a side view of Figure 6, shows screen 10 extending from the bottom of the water layer to the surface and interposed between the charge and the spread. This arrangement, of course, is the most complete type of screen to insure the absorption of ray paths directed both vertically upwardly and vertically downwardly.

Figure 11:
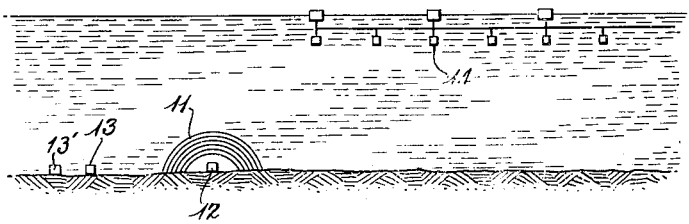
Figure 11 shows an explosive charge surrounded by a screen of dispersible material prior to detonation of the charge.

In Figure 11, a screen of dispersible material 11 encloses an explosive charge 12 and is located between the main charge 13 and the seismometer array 14. The composition of material 11 is such that upon detonation of explosive charge 12, the force of the explosion disintegrates the material into numerous small, finely divided particles which are forced into a hemispherical pattern surrounding the charge 12. The effect of these finely divided particles is to form a screen similar to that formed by gas bubbles and acts as a sound dispersing screen. Thus, as the ray paths are generated upward and downward from the seismic shot, the wave front must pass through this sound dispersing screen and the tendency to generate reverberations is eliminated. In this figure, the seismometer spread 14 is shown suspended by floats from the surface of the water.

As shown in the various figures, the source can be located anywhere in the medium from the bottom to immediately below the surface of the water. Also, as is well known to those skilled in the art, more than one source may be used to generate the seismic waves as indicated by the additional charges 1', 5', 8' and 13' in the various figures. Actually, the source or sources may generate the undesired reverberations whether placed in the water medium, above the water surface, or in a hole beneath the bottom. Also, it will be recognized immediately by anyone familiar with the art that the detector array can be placed near the surface, within the layer, or on or beneath the bottom and still receive the reverberations generated. The important factor in this invention is to place the screen in relation to the source or sources and the detectors so as to distort and absorb any wave fronts generated that would otherwise obscure the desired reflections from substrata horizons.

Although the present invention has been shown and described with reference to specific embodiments, nevertheless, various changes and modifications obvious to one skilled in the art are within the spirit, scope and contemplation of the present invention.

What is claimed is:

1. A system for seismic prospecting over water covered areas of subsurface strata to obtain improved seismic records comprising seismic source means generating seismic waves in the water covering the underlying strata, detecting means in the water for detecting said seismic waves and means for generating at a location in said water between the generated seismic waves and the detecting means a screen comprised of gas cells to prevent waves in the nature of reverberations generated in said water covering by said seismic source means from reaching said detecting means and thereby facilitating the identification of desired reflections of seismic waves from underlying horizons.

2. A system for seismic prospecting as recited in claim 1 wherein the means for generating a screen of gas cells comprises means to react chemically with water to form gas bubbles.

3. A system for seismic prospecting as recited in claim 1 wherein the means for generating a screen of gas cells comprises means to electrolyze water to form gas bubbles.

4. A system for seismic prospecting as recited in claim 1 wherein the means for generating a screen of gas cells comprises slow burning explosive means to form gas bubbles.

5. A system for seismic prospecting as recited in claim 1 wherein the means for generating a screen of gas cells comprises means to release air to form bubbles.

6. A system for seismic prospecting as recited in claim 1 wherein the means for generating a screen of gas cells comprises particles obtained by finely dividing a mass of cellular material.

7. A system for seismic prospecting as recited in claim 6 wherein said cellular material is foam rubber.

8. A system for seismic prospecting as recited in claim 6 wherein said cellular material is finely divided by explosive means.

References Cited in the file of this patent

UNITED STATES PATENTS

| | | |
|---|---|---|
| 1,348,828 | Fessenden | Aug. 3, 1920 |
| 1,672,495 | McCollum | June 5, 1928 |
| 2,411,537 | Goodale | Nov. 26, 1946 |
| 2,586,706 | Parr | Feb. 19, 1952 |
| 2,587,301 | Ewing | Feb. 26, 1952 |
| 2,609,885 | Silverman | Sept. 9, 1952 |
| 2,619,186 | Carlisle | Nov. 25, 1952 |
| 2,632,520 | Hintze | Mar. 24, 1953 |